No. 811,377. PATENTED JAN. 30, 1906.
C. E. CLEVELAND.
LUMBER FEEDING MACHINE.
APPLICATION FILED MAR. 6, 1905.
6 SHEETS—SHEET 6.
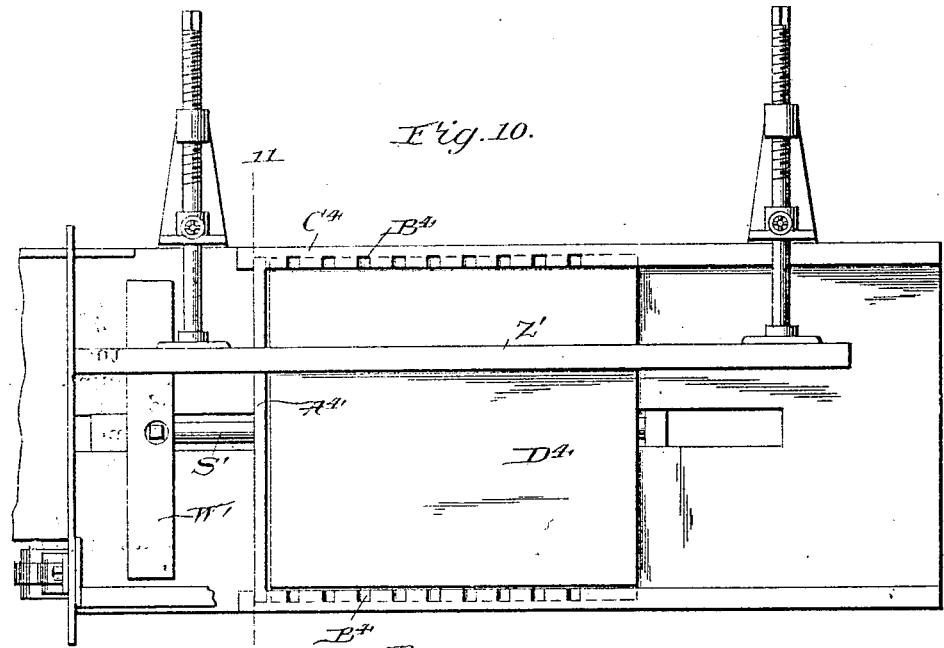
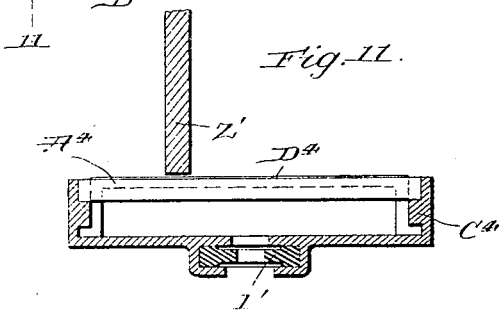
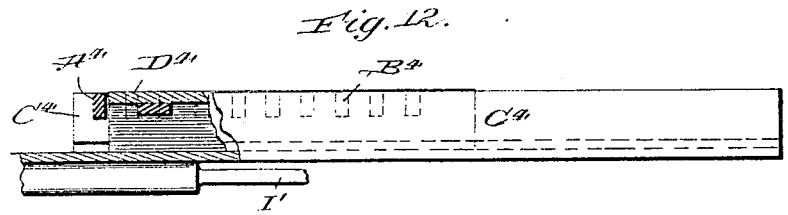

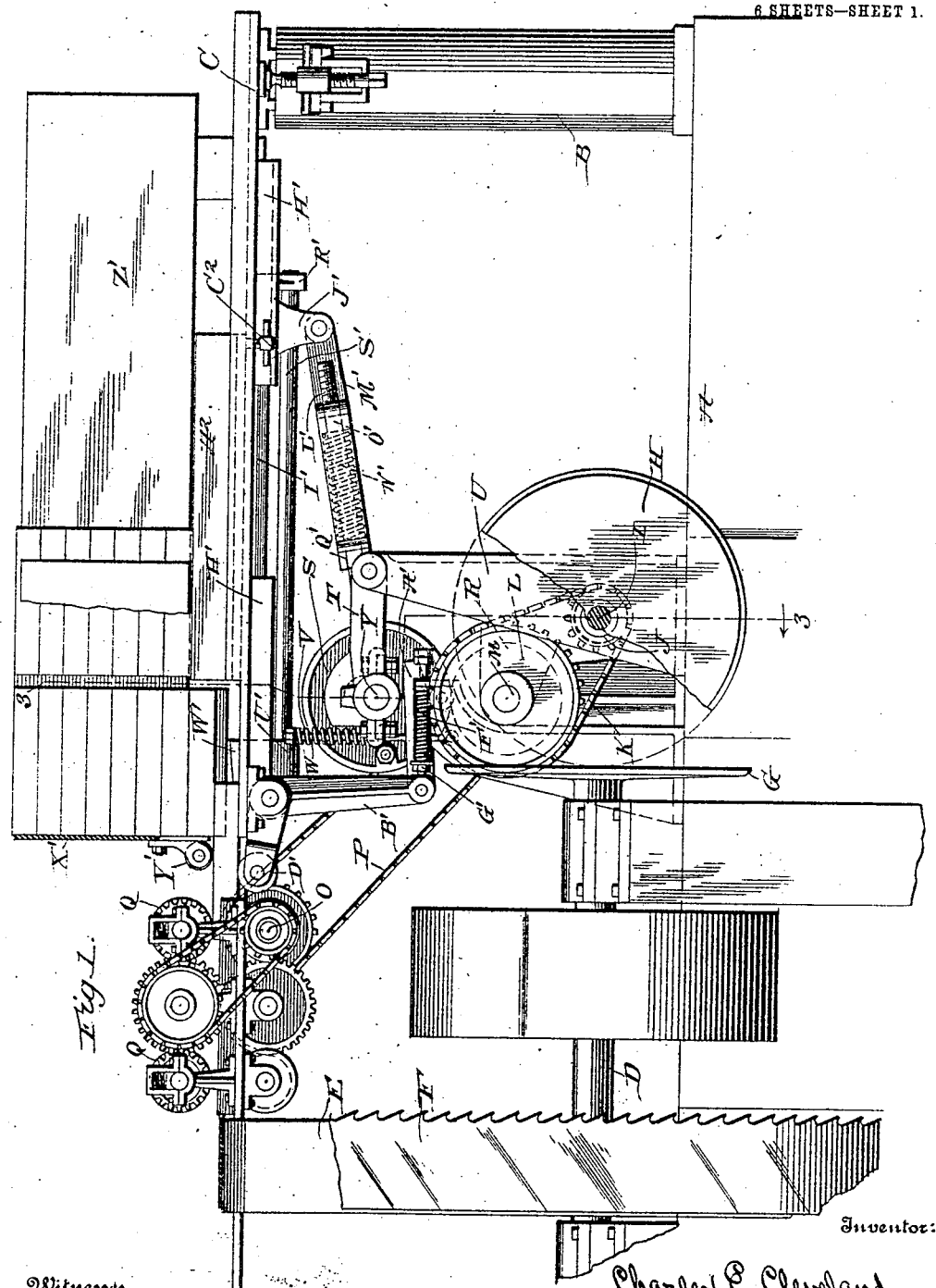

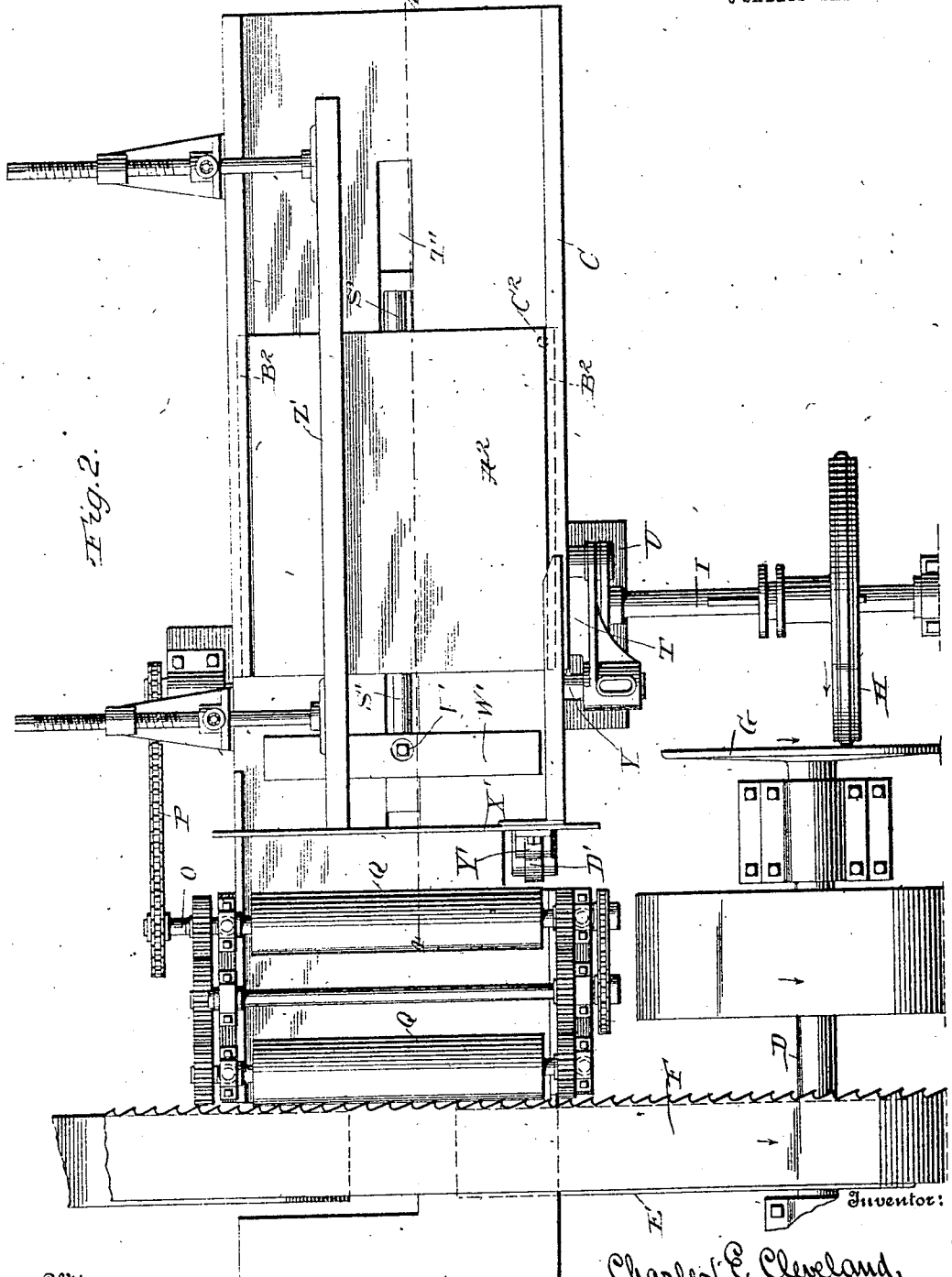

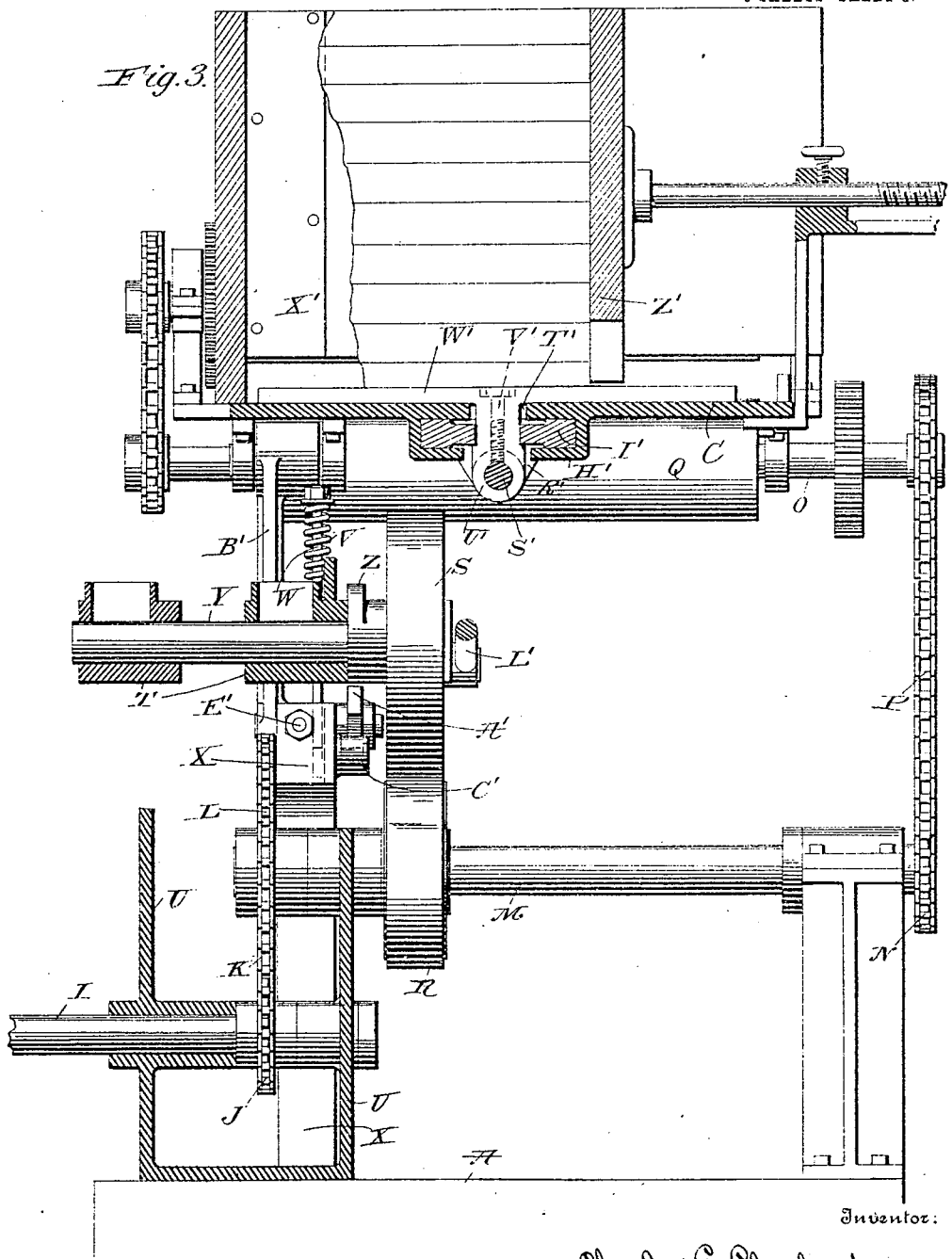

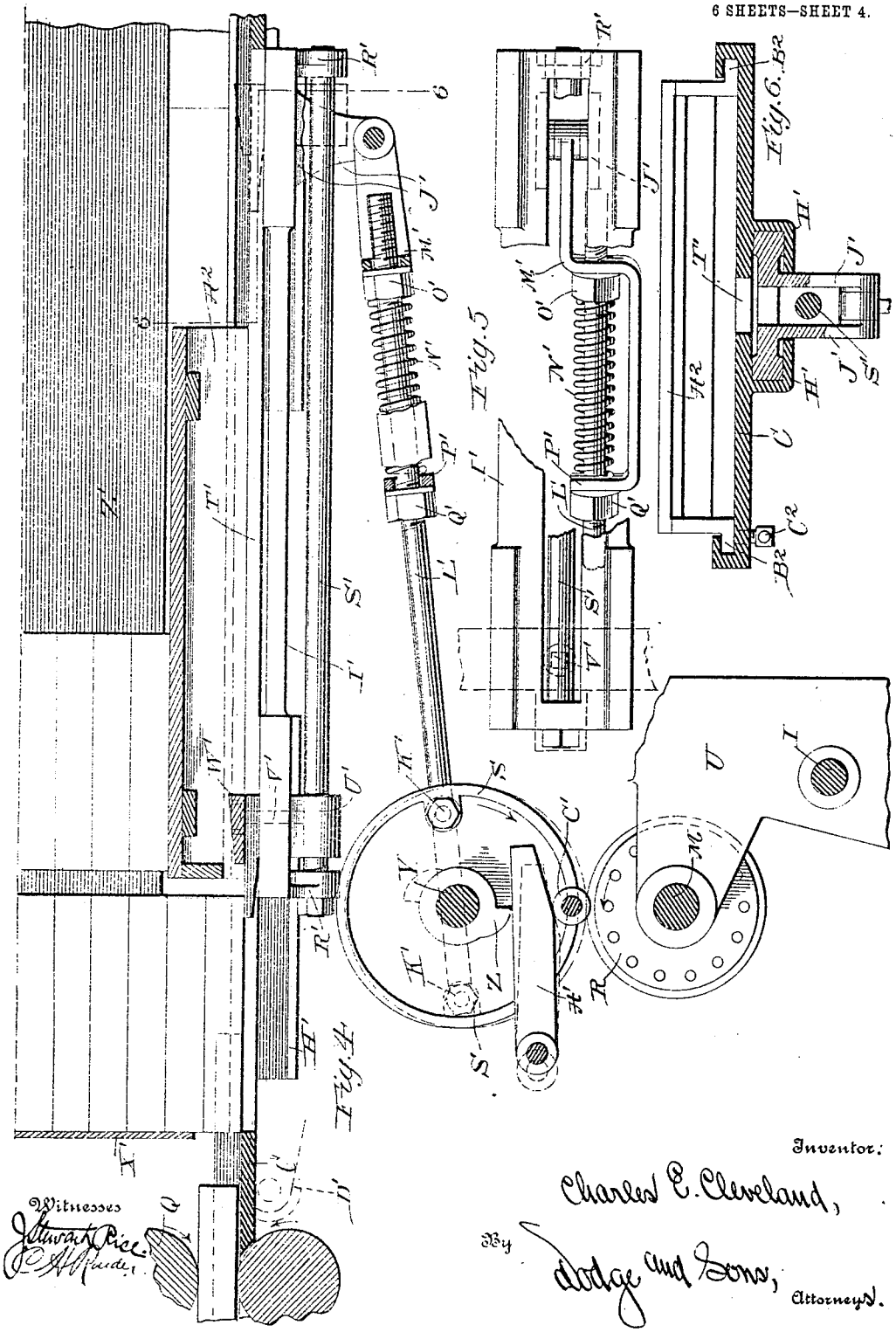

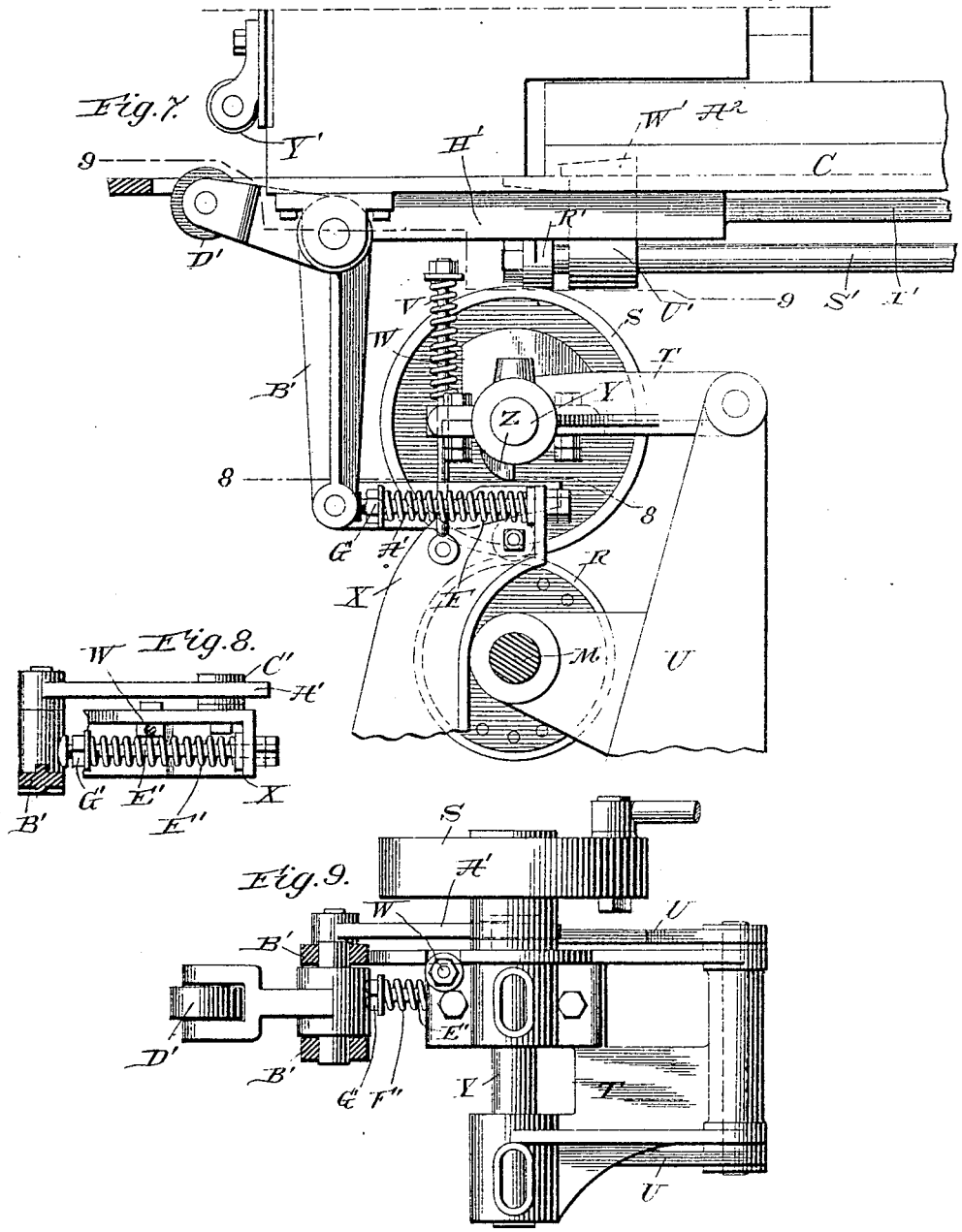

UNITED STATES PATENT OFFICE.

CHARLES E. CLEVELAND, OF FOND DU LAC, WISCONSIN.

LUMBER-FEEDING MACHINE.

No. 811,377.　　　　Specification of Letters Patent.　　　　Patented Jan. 30, 1906.

Application filed March 6, 1905. Serial No. 248,605.

*To all whom it may concern:*

Be it known that I, CHARLES E. CLEVELAND, a citizen of the United States, residing at Fond du Lac, in the county of Fond du Lac and State of Wisconsin, have invented certain new and useful Improvements in Lumber-Feeding Machines, of which the following is a specification.

My present invention pertains to improvements in lumber-feeding machines, the construction and advantages of which will be hereinafter set forth, reference being had to the annexed drawings, wherein—

Figure 1 is a side elevation of the machine or apparatus shown as applied to a resawing-machine; Fig. 2, a top plan view thereof; Fig. 3, a vertical transverse sectional view on the line 3 3 of Fig. 1, looking toward the saw; Fig. 4, a longitudinal vertical sectional view taken on the line 4 4 of Fig. 2; Fig. 5, a top plan view, partly broken away, of the cross-head or slide; Fig. 6, a transverse vertical sectional view on the line 6 6 of Fig. 4; Fig. 7, an enlarged side elevation showing the frictional driving-wheels and the mechanism employed for separating them through the action of the stock being fed; Fig. 8, a horizontal sectional view on the line 8 8 of Fig. 7; Fig. 9, a similar view on the line 9 9 of Fig. 7;
Fig. 10, a top plan view of a modified form of construction; Fig. 11, a transverse sectional view on the line 11 11 of Fig. 10, and Fig. 12 a side elevation partly in section.

The object of my invention is to provide an improved machine or mechanism for feeding stock to a saw, the invention being especially applicable for use with a resawing-machine, and for the purpose of illustration the apparatus is shown in connection with such a machine. While so shown, it is conceivable that it may be used with other types of machines, and the invention is not limited to employment with a machine of the class illustrated.

Referring to Figs. 1 to 9 of the drawings, A indicates the bed-plate of the machine, B the supporting-column, and C the main table adjustably mounted thereon. D designates the main driving-shaft, carrying the band-wheel E for the saw F. Secured to shaft D is a friction driving-disk G, which works in conjunction with a friction-wheel H, adjustably mounted upon a shaft I. Said shaft, as will be seen upon reference to Fig. 3, is provided with a sprocket-wheel J. A chain K passes about said wheel and a second sprocket-wheel L, mounted upon a shaft M. The opposite end of shaft M is provided with a sprocket-wheel N, and motion is transmitted from said sprocket-wheel to a shaft O through the medium of a sprocket-chain P. Shaft O, as will be clearly seen upon reference to Figs. 1, 2, and 3, drives a series of feed-rolls, (designated by Q.) These feed-rolls may be of any approved type and are so geared together as to be positively driven.

The construction thus far described is the same as is employed in resawing-machines now placed upon the market with the possible exception of the intermediate shaft M. Said shaft has mounted upon it a paper friction or power wheel R, which is designed at certain periods to come into contact with an iron friction or power wheel S, standing immediately above it. Said wheel S is carried in a yoke or frame T, fulcrumed in the upper end of a post or column U, Figs. 1 and 7, and is normally depressed or forced downwardly toward the paper friction through the action of a spring V, which is mounted upon a rod W, pivotally secured at its lower end to an upright or standard K. Said rod W passes through an opening in the upper end of the yoke or frame T, and the lower end of the spring V bears on the upper face of said yoke. The tension of the spring may be varied by adjusting a nut upon the upper end of the rod.

Secured upon a shaft Y, which supports the iron friction-wheel S or formed as an integral portion of said friction-wheel, is a cam Z. Said cam acts in conjunction with a reciprocating slide or rod A′, which is connected at its forward or outer end to the lower extremity of a bell-crank lever B′, fulcrumed at a point immediately below the forward end of the feed hopper or chute hereinafter referred to. As will be seen upon reference to Fig. 4, the inner or free end of the slide or rod is beveled or cut away on its under face and rests at this point upon a roll C′, mounted upon a stud extending outwardly from the upright or standard X. (See Figs. 3, 7, and 8.) When the parts are in the positions shown in Fig. 4, slide A′ and cam Z serve to separate the friction-wheels and prevent motion being imparted from the continuously-rotating paper friction R to the iron friction S. At this time the push-bar which removes the lowermost piece of lumber from the chute is at its extreme rear position, as indicated in Fig. 4. Normally the upper free end of the bell-crank lever B' and the roller D', carried thereby, are thrown upwardly into the path of the lumber, and to effect this a rod E' is secured to the lower end of the bell-crank lever, (see Figs. 7 and 8,) said rod being extended through a flange or lateral projection formed upon the upright or standard X. A coiled spring F' surrounds the rod and bears at its outer or forward end against a nut G', threaded upon the stem or rod E'. In this manner the tension of the spring may be adjusted as desired.

The main table or bed C is provided with a way or channel formed by the downwardly and inwardly projecting lips H', and a slide or cross-head I' is mounted in said way or channel. The rear portion of the slide or cross-head is formed with downwardly-projecting lugs J', (see Figs. 4 and 6,) and a pitman or rod extends forwardly from said lugs to the iron friction S, to which it is connected by a suitable wrist-pin or bolt K'. As will be seen upon reference to Figs. 4 and 5, the pitman or connecting-rod is made in two parts with an interposed spring, one member L' being connected to the iron friction S and passing freely through openings formed in the member M', connected to the lugs J'. A coiled spring N' is interposed between a nut O', mounted upon the member L' and the lateral offset P' of member M'. The tension of the spring may be varied by adjusting nut O'. During the forward movement of the slide I' or when the iron friction is moving in the direction indicated by the arrow in Fig. 4 the spring will permit the parts to yield if necessary. Upon a rearward movement, however, a nut Q', carried by the member L', abuts against the offset P' and moves the parts back positively without yielding action. The purpose of this yielding action will be hereinafter set forth.

The forward portion of the slide I' is slotted, as shown in Fig. 5, and lugs R' extend downwardly from each end of said slide, as will be seen upon reference to Fig. 4. A rod S' is carried by the lugs and extends in line with a slot or way T', formed in the bed or table. (See Figs. 2 and 6.) A block U' encircles the rod and is adjustably secured thereto by a bolt or similar locking device V', Figs. 2 and 3, said block extending upwardly through a slot formed in the bed or table. Secured to the upper face of the block is a push-bar W', said bar lying close to the upper face of the table and being moved back and forth thereon as the slide is actuated in one or the other direction.

Mounted upon the table adjacent to the feed-rolls is a hopper X', adapted and designed to hold the lumber or stock which is to be fed to the saw. As will be seen upon reference to Figs. 1 and 7, the table is cut away between the forward face of the hopper and the first feed-roll of the series, and roller D' of the bell-crank lever B' projects through this opening into the path of the stock, which passes from the hopper to the feed-rolls. In order to properly hold the stock down upon the roller D', and thus insure that lever B' shall perform its proper function, an auxiliary roll Y' is mounted upon the forward face of the hopper. The hopper is provided with an adjustable side Z', (see Fig. 2,) and in order to effect adjustment for the length of the stock I provide an auxiliary table $A^2$, said table having outwardly-extending flanges $B^2$, which extend into grooves or channels formed adjacent to the outer edge of the main table. (See Figs. 2 and 6.) The auxiliary table is made hollow, so that the push-bar W' may pass beneath the same, as shown in Fig. 4. Said table is adjustable lengthwise upon the main bed or table and is secured in its adjusted position by a screw $C^2$. As will be seen upon reference to Fig. 4, the auxiliary table $A^2$ forms the support for a stack of boards which may be moved forwardly therefrom when all but two of the pieces of lumber or boards in the hopper are removed. The auxiliary table also prevents the lowermost piece of stock from being drawn back by the push-bar W' when said bar is retracted after having forced said piece of lumber from the hopper. In other words, the forward portion of the auxiliary table may be said to form the rear member of the hopper. The parts are so proportioned and adjusted as to give the push-bar W' an overtravel or a travel slightly faster than that of the board which has been grasped by the feed-rolls and presented to the saw. In other words, it is desirable that each board or piece of stock should abut against those adjacent thereto as it is fed out of the hopper, and to prevent breakage of the parts the yielding connecting-rod or pitman hereinbefore referred to is employed.

The operation of the machine is as follows: The hopper is filled with boards, the side Z' having been adjusted to the width of the stock and the table $A^2$ to the length thereof. Block U', which carries push-bar W', is adjusted upon the rod S', so that the bar will pass beneath the auxiliary table or clear of the hopper, as shown in Fig. 4. With the parts in the positions indicated in the figure just referred to the bell-crank lever B' will be thrown upwardly or into the position shown in Fig. 7, withdrawing the slide or rod A' from beneath the cam Z', thereby permitting the iron friction S to be forced downwardly onto the constantly-rotating paper friction R. Motion will thus be transmitted to the iron friction and through the pitman to the slide I', carrying the push-bar W' forward against the lowermost piece of stock in the hopper and projecting the same outwardly therefrom between the roller D' and the auxiliary roll Y'. Inasmuch as the rate of travel of the push-bar is faster than that of the feed-rolls, the stock thus projected will be pushed against the rear end of the piece being acted upon by the rolls and the feed-rolls thus have a piece of stock to act upon at all times. Immediately the board is projected from the hopper the bell-crank lever B' is depressed, as is shown in Fig. 1, thereby throwing the slide or rod A' rearwardly or into the position shown in full lines in Fig. 4, where it stands ready to coact with the cam Z when said cam occupies the position illustrated in the figure just alluded to. The cam is so timed that the slide, with the push-bar, will make a complete forward and rearward movement before the iron friction is elevated or drawn out of contact with the paper friction.

The bell-crank lever and its attendant parts may be termed a stop device or mechanism.

In Figs 10 to 12, inclusive, I have shown a modification of the invention. Instead of using the front face of the auxiliary table as a stop for preventing retrograde movement of the stock, I employ a cross-bar $A^4$, the ends of which are mounted in oppositely-disposed notches $B^4$, formed in upwardly-projecting sides $C^4$ of the main table. There is a series of these notches upon each side and the bar may be adjusted according to the dimensions of the stock. The auxiliary table $D^4$ may also be employed, being moved and secured in its adjusted position as required. Its presence, however, is not essential; otherwise the structure is the same as that hereinbefore described.

It is to be noted that the speed or rate of travel of the feed-rolls and the push-bar may be varied as desired and that the variation will be the same in each, inasmuch as they derive their power from the same source. It is likewise to be noted that the push-bar travels at varying rates of speed throughout different portions of its stroke, this being due to the connection of the pitman to the friction S. During the first part of the travel the speed is relatively slow. It then increases until the wrist-pin reaches its lowest position, and from that point the speed decreases until it reaches its limit of forward travel, as indicated in dotted lines, Fig. 4. The same movement takes place as the push-bar is drawn back.

While the yielding pitman construction is preferable, a rigid or non-extensible pitman may be employed, in which case the friction-wheels will slip upon each other should the push-bar meet any obstruction.

Having thus described my invention, what I claim is—

1. In a machine for feeding lumber, the combination of continuously-operating feed-rolls; a continuously-operating power device; a feed device arranged at a point in advance of the feed-rolls; and means controlled by the stock for throwing the feed device into operative relation with the power device, and for positively withdrawing the connection between said feed and power devices.

2. In a machine for feeding lumber, the combination of continuously-operating feed-rolls; a continuously-operating power device; a periodically-operated feed device arranged at a point in advance of the feed-rolls; and means controlled by the stock for throwing the lumber-feeding device into operative relation with the power device, and for positively withdrawing the connection between said feed and power devices.

3. In a machine for feeding lumber, the combination of a pair of continuously-operating feed-rolls; a continuously-operating power device; a periodically-operated lumber-feeding device arranged at a point in advance of the feed-rolls; and means interposed between the feed-rolls and lumber-feeding device, and controlled by the movement of the stock, for throwing said lumber-feeding device into operative relation with the power device.

4. In a machine for feeding lumber, the combination of continuously-operating means for presenting the lumber to a saw; a continuously-operating power device; a periodically-actuated lumber-feeding device arranged at a point in advance of the lumber-presenting means; and means interposed between the means for feeding the lumber to the saw and said lumber-feeding device for throwing the lumber-feeding device into operative connection with the power device, said means being controlled by the passage of the stock, substantially as described.

5. In a machine for feeding lumber, the combination of a continuously-operating feeding device for presenting the lumber to a saw; a hopper for containing the stock to be fed; a reciprocating push-bar working in line with the bottom of the hopper; means for moving said push-bar; and a stop device standing in the path of movement of the stock from the hopper to the feed device, said stop device serving to throw the actuating mechanism for the push-bar into and out of operation, substantially as described.

6. In a machine for feeding lumber, the combination of a hopper; a push-bar working in line with the lower portion thereof; means for actuating said push-bar, a stop device standing in line with the stock as it is pushed from the hopper and serving to throw the operative mechanism of the push-bar into and out of action, and a pair of continuously-operating feed-rolls arranged at a point beyond the hopper and designed to receive the stock which is removed therefrom by the push-bar.

7. In a machine for feeding lumber, the combination of a hopper; a push-bar working in line therewith; a constantly-operating power device; means for actuating the push-bar; means standing in the path of travel of the stock for throwing the push-bar-operating means into and out of contact with the power device; and a pair of continuously-operating feed-rolls arranged at a point beyond the hopper and designed to receive the stock which is removed therefrom by the push-bar.

8. In a machine for feeding lumber, the combination of a table; feed-rolls operating in line therewith; a hopper; a push-bar working in line with the hopper; a constantly rotating power-wheel; a second power-wheel; a connection intermediate said second power-wheel and the push-bar; and means operated by the movement of the stock to raise and lower said second power-wheel into and out of operative relation with the first power-wheel.

9. In a machine for feeding lumber, the combination of a constantly-acting feed device; a hopper; a push-bar working in line with the hopper; means for advancing said push-bar at a speed greater than that of the travel of the feed device; and means for throwing the push-bar out of operation.

10. In a machine for feeding lumber, the combination of a saw; a lumber-feeding device; a hopper; a push-bar working in line therewith; means for reciprocating said push-bar; a yielding connection between the push-bar and said means; and means for throwing the push-bar into and out of operation.

11. In a machine for feeding lumber, the combination of continuously-operating feed-rolls; a hopper; a push-bar working in line with the hopper; a continuously-rotating power-wheel; a second power-wheel normally in operative relation with the first wheel; connections intermediate said second wheel and the push-bar; and a stop device standing in the path of travel of the lumber from the hopper to the feed-rolls, said stop device serving to bring the push-bar to rest when it has reached its limit of rearward travel, substantially as described.

12. In a machine for feeding lumber, the combination of continuously-operating feed-rolls; a hopper; a push-bar working in line with the hopper; a constantly-rotating power-wheel; a second power-wheel carried in movable bearings; connections intermediate said second power-wheel and the push-bar; a stop device located between the hopper and the feed-rolls; means for normally projecting said stop device into the path of travel of the stock from the hopper to the feed-rolls; and a cam rotating with the second power-wheel and acting in conjunction with the stop device to elevate said second power-wheel, whereby the push-bar is brought to rest, substantially as described.

13. In a machine for feeding lumber, the combination of a hopper; a push-bar working in line therewith; a power-driven wheel; a second power-wheel movable into and out of contact with said first wheel; connections intermediate said second wheel and the push-bar; a bell-crank lever; a roller carried by the upper end of the bell-crank lever in line with the path of travel of the stock as it is forced out of the hopper; a slide pivotally connected to the lower end of the bell-crank lever, said slide having a beveled portion; a support for said slide; a cam rotatable with the second power-wheel; and means for throwing the free end of the bell-crank lever upwardly, whereby the slide will be normally withdrawn from beneath the cam, substantially as described.

14. In a machine for feeding lumber, the combination of a hopper; a push-bar working in line with the hopper; a constantly-rotating power-wheel; an upright or standard; a yoke or frame pivotally connected to said standard; a second power-wheel mounted in said yoke or frame; means for normally forcing said yoke or frame downwardly toward the first power-wheel; a cam rotatable with the second power-wheel; connections intermediate said wheel and the push-bar; a bell-crank lever; a roller carried by the free end of said bell-crank lever in line with the path of travel of the stock from the hopper; a slide secured to the lower end of the bell-crank lever and standing in the path of the cam; and means for normally projecting the upper end of the bell-crank lever into the path of travel of the stock.

15. In a machine for feeding lumber, the combination of a table having upstanding sides; a hopper arranged at one end thereof; a push-bar working in line with the lower end of said hopper; and an adjustable cross-bar secured in upstanding sides of the table in a plane above the push-bar.

16. In a machine for feeding lumber, the combination of a main table; a hopper mounted adjacent to one end thereof, said hopper comprising a fixed end, a fixed side, and an adjustable side; an auxiliary table mounted upon the main table and adjustable longitudinally thereon; a push-bar working in line with the lower portion of the hopper and passing beneath the auxiliary table when in its retracted position; and a cross-bar mounted in oppositely-disposed notches formed in the upstanding sides of the main table, said bar being located in front of the auxiliary table, substantially as described.

In testimony whereof I have signed my name to this specification in the presence of two subscribing witnesses.

CHARLES E. CLEVELAND.

Witnesses:
FRANK J. WOLFF,
ARNOLD PETRI.